No. 644,409. Patented Feb. 27, 1900.
J. L. CREVELING.
ELECTRICAL DISTRIBUTION.
(Application filed Oct. 28, 1899.)
(No Model.)
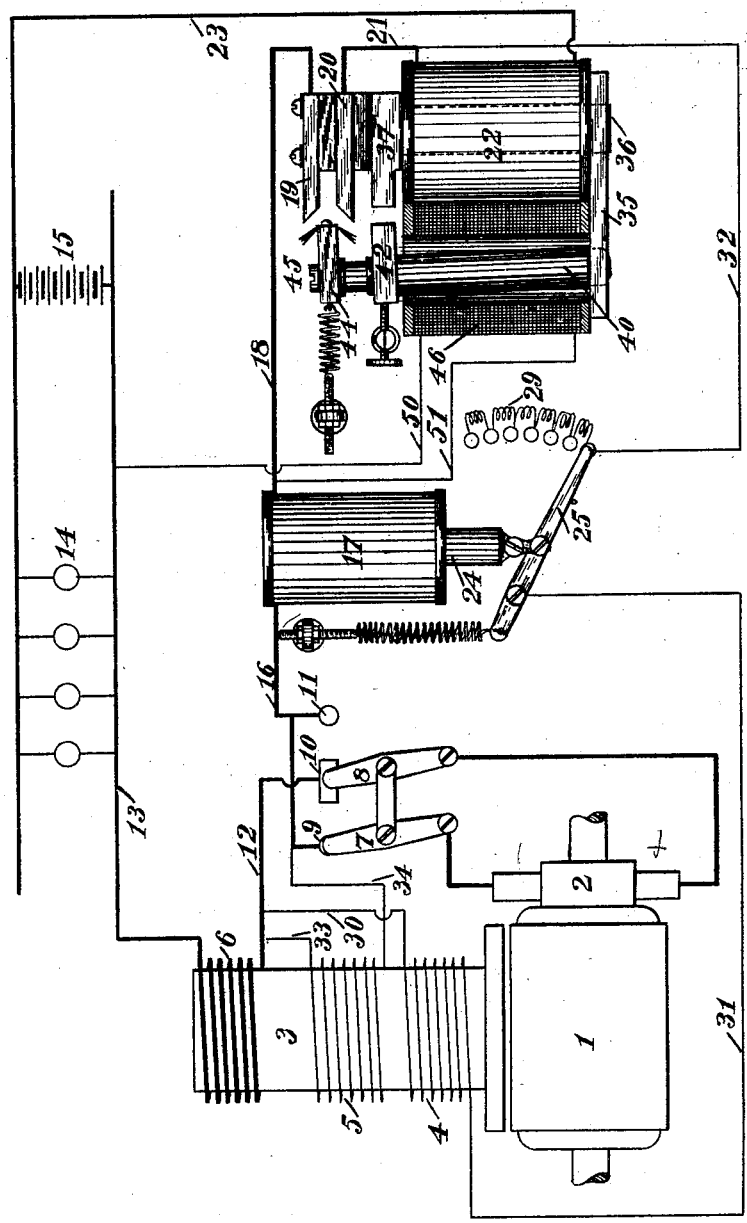
Witnesses:
Inventor:
John L. Creveling
By Briesen & Knauth
his Attorneys

UNITED STATES PATENT OFFICE.

JOHN L. CREVELING, OF NEW YORK, N. Y.

ELECTRICAL DISTRIBUTION.

SPECIFICATION forming part of Letters Patent No. 644,409, dated February 27, 1900.

Application filed October 28, 1899. Serial No. 735,039. (No model.)

*To all whom it may concern:*

Be it known that I, JOHN L. CREVELING, a resident of the city of New York, borough of Manhattan, county and State of New York, have invented an Improved System of Electrical Distribution, of which the following is a specification.

My invention relates to systems of electrical distribution.

In the accompanying drawing I have illustrated a system of electrical distribution embodying my invention, with the understanding, however, that the said drawing is illustrative merely and will be referred to for the purpose of fully and adequately explaining one form of system of electrical distribution in which my invention is embodied.

The system of distribution forming the subject-matter of my said invention is especially adapted for use as a car-lighting system.

The object of my invention is to produce a system of electrical distribution and a switch, in which system a dynamo is employed which is liable to reversals of direction of rotation and variability in the speed of rotation, which dynamo is used in combination with storage batteries or accumulators and provided with means—to wit, the switch just above mentioned—whereby the armature-circuit of the dynamo will be put in circuit with the storage batteries when the dynamo has reached such a voltage that it will suffice to cause the same to operate the translating devices and will not be liable to be run as a motor by the storage batteries or accumulators.

In the accompanying drawing, 1 represents the armature of the dynamo, provided with the usual commutator 2 and the field-magnet 3. 4 is the battery-shunt of the said dynamo, which is connected across from the main 12 to the main 21 by the wires 30 31 to the pivoted switch-lever 25, rheostat 29, when the same is in circuit, and wire 32.

5 is a field-coil or self-excited shunt of the dynamo which is connected by wires 33 and 34 in shunt to the main of the dynamo.

6 is the regulating or demagnetizing coil, which is in series with the mains 12 13, as is usual in car-lighting systems.

7 8 represent the pole-changer, which is suitably operated, preferably from the shaft of the armature, and coöperates with the contacts 9, 10, and 11, contact 10 being connected to the main 12 and the contacts 9 and 11 being connected to the main 16. The wire 18 is a continuation of the main 16, and the solenoid 17 is included in series with the said mains or wires 16 and 18. The battery 15 is connected across the mains 13 23, as are also the translating devices. The wire 18 leads to a contact 19, which is insulated from an adjacent contact 20, to which the wire 21 is connected. The magnet 22 is included in series with the mains 21 and 23 and acts upon a core 36, which is provided with a pole-piece 37, supporting contacts 19 20, before mentioned. The core 36 is provided with a yoke 35, on which is pivoted a core 40, provided with a pole-piece 42 and a block 44, carrying a switch or bridging device 45, which is adapted to bridge across the contacts 19 20, which, as before stated, are in series with the dynamo-mains. The core 40 is held against its back-stop by a spring, the back-stop and spring tension being adjustable in any usual manner. The swinging core 40 is acted upon by a coil 46, surrounding the same, which coil is shunted across the dynamo-mains by wires 50 51.

The operation of the device is as follows: It is assumed that the functions of the various field-magnet coils are well understood. Let us suppose that the parts are in the positions shown and the dynamo is started up in such a direction as to make the lower brush the positive brush. The battery-current is flowing in the battery-shunt 4 by wire 30, wire 31, lever 25, wire 32, to the wire 21, through the magnet 22 to the wire 23. It will thus be seen that the battery-shunt produces a field and at the same time magnetizing the pole-piece 37 to cause the same to repel the pole-piece 42, it being understood that the generator is supplying the coil 46 with current through the wires 50 51. As the current delivered by the generator increases in voltage the coil 46 will be given more and more current, and consequently when the said voltage reaches a potential above the battery-voltage the magnetism of the pole-piece 42 will be sufficiently great to overcome the magnetism of the pole-piece 37, whereupon the core 40 will swing upon its pivot and bring the bridging or switching piece 45 into contact with contacts 19 and 20, thereby closing the line-circuit of the generator. As soon as this occurs the entire current from the generator will pass through the magnet 22, which will serve to hold the core 40 strongly up, and thereby keep the switch 45 between the contacts 19 20 firmly in place. When the generator-circuit is closed, the solenoid 17 will attract its core 24 and cause the same to rise, so that at a full load the said core will be drawn up, thereby switching the resistance of the rheostat 29 into the shunt-battery circuit, with which it is in series. If now the speed of the generator be slackened until it is no longer delivering the normal or proper voltage to the line, the slight back discharge of the battery will open the switch 45 in a well-known manner and the battery-current will be effective to prevent the closure of the said circuit at the points 19 and 20 until the dynamo has picked up the proper voltage, for although the dynamo-current may be flowing in the coil 46 very near the normal voltage the air-gap between 42 and 37 is so considerable that the weak battery-current flowing in 22 is sufficient to maintain the polarity of 37 regardless of 46, so as to prevent the return of 42 until the dynamo has picked up the proper voltage. In the system shown the solenoid 17 and rheostat arrangement in the shunt have a further function. It will be observed that normally when the machine is running at its normal voltage the shunt in which the switch arm or lever 25 is located is receiving current from the dynamo by reason of the fact that the shunt is derived from the mains. When, however, the dynamo delivers more than a normal current to the line, the solenoid 17 will draw up its core 24, switching in the rheostat-coils 29, and thereby decreasing the current to line without any appreciable decrease in the voltage, it being remembered that we are here dealing with counter electromotive forces and not merely with resistances, and also with differential windings.

Having described my invention, what I claim, and desire to secure by Letters Patent, is—

1. In a system of electrical distribution, the combination of the following instrumentalities in operative combination, to wit, a generator, a storage battery adapted to be charged thereby, an electromagnetic switch in the generator-main circuit, a field-coil in shunt to the generator-mains, an opposing field-coil in the battery main circuit, a battery-shunt field-coil, a variable resistance in series therewith and means operated by the fluctuations of the current of the generator for varying the amount of variable resistance in circuit with the battery-shunt field-coil.

2. In a system of electrical distribution, the combination of the following instrumentalities in operative relation, to wit, a generator and a storage battery in circuit therewith and a line-switch, a magnet-coil in a derived circuit to the generator-circuit and a magnet-coil in electrical connection with the generator-circuit and the battery-circuit, the connections of the said last-named coil being such that when the line-switch is closed in the normal operation of the system the generator-current will circulate in the said coil and when the line-switch is open a battery-current will circulate in the said coil in a reverse direction to the direction taken by the current supplied by the generator.

3. In a system of electrical distribution comprising a generator and storage battery in circuit with each other, the combination of electromagnetic means for controlling the flow of current in the generator-mains, comprising a coil responding to the fluctuations of tension in the generator-main circuit and a coil normally in the generator-main circuit and connected to the battery by a conductor distinct from the generator-main circuit, the said conductor being normally in the battery-circuit when the generator-circuit is interrupted.

JOHN L. CREVELING.

Witnesses:
 GEO. E. MORSE,
 MAURICE BLOCK.